June 24, 1952
J. C. BOTTS ET AL
2,601,243
PROCESS FOR PRODUCING CONSOLIDATED
INSULATION ON HIGH-VOLTAGE COILS
Filed Oct. 20, 1949
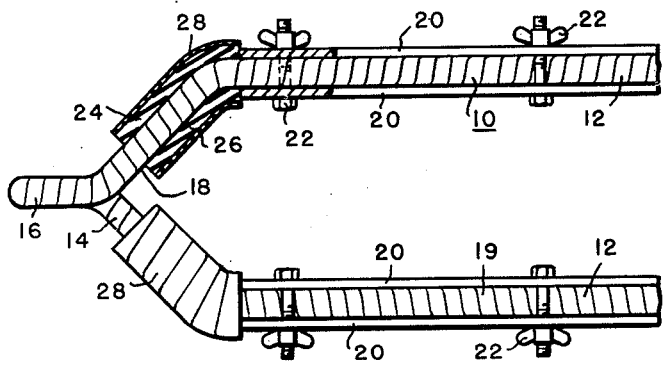
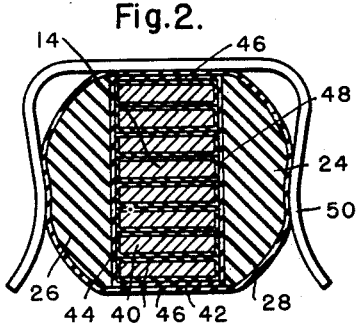
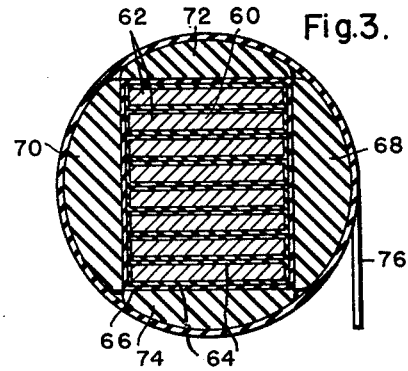
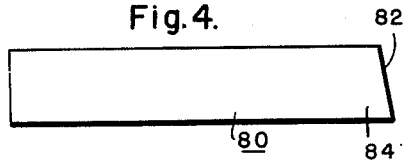
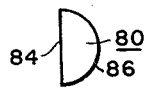
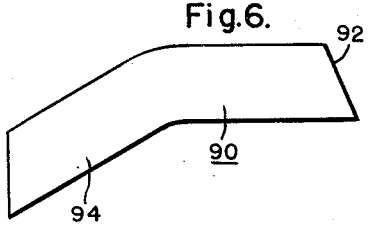
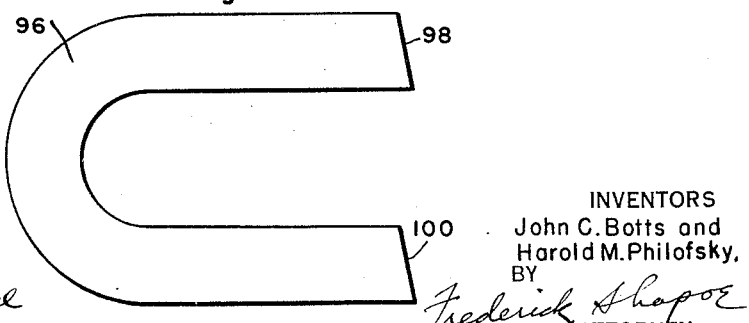
WITNESSES:
E.G. McCloskey
Wm. Le Groove
INVENTORS
John C. Botts and
Harold M. Philofsky.
BY
Frederick Shape
ATTORNEY Patented June 24, 1952

2,601,243

UNITED STATES PATENT OFFICE 2,601,243

PROCESS FOR PRODUCING CONSOLIDATED INSULATION ON HIGH-VOLTAGE COILS

John C. Botts and Harold M. Philofsky, Pittsburgh, Pa., assignors to Westinghouse Electric Corporation, East Pittsburgh, Pa., a corporation of Pennsylvania Application October 20, 1949, Serial No. 122,438

9 Claims. (Cl. 154—80)

This invention relates to a process for producing consolidated end turn insulation on high voltage coils.

In building high voltage coils for electrical machines, particularly for use above 1,000 volts, it has been discovered that usually failures, if they occur, are localized at the end turns and particularly in the portion of the ends turns nearest the slot portions of the coils. The failures occurring at the end turns are occasioned by the geometry of the end turns. The complex curves present in the end turns prevent adequate consolidation of the insulation, and thereby voids and non-uniform insulation are present. This gives rise to corona. When the coils are applied to the magnetic cores, the end turns are also subjected to mechanical stresses, such that the insulation is stressed to the greatest extent at the portions of the end turns nearest the stator slot. Separation of tape has been noted in this portion of the end turns in many cases after the electrical apparatus has operated for several years. Furthermore, it is necessary that there be a sufficient clearance between successive end turns in the electrical apparatus, otherwise corona may occur due to the difference in potential, particularly between phase coils.

By contrast to the end turn insulation shortcomings, the slot portions of the coils are usually sized and shaped in hot presses so that these portions of the coil will fit properly into the slots of stators or the like. This pressing operation can be readily and conveniently carried out on the slot portions because slot portions are relatively straight and of simple geometry. A few types of such slot presses can handle a great variety of coils. The pressing operation compacts the insulation at the slot portion so that it is relatively void-free and therefore corona is minimized therein. The slot portions are supported by the iron, and therefore the mechanical stress on the insulation is much less than that on the end turn portions outside of the slot areas.

No commercially usable process is available for consolidating end turn insulation to size and to render it void free. Steel dies or presses for consolidating end turns would be expensive because of the complex geometry of the end turns due to the multitude of shapes of end turns. Also the end turns are not uniform even in similar coils and much hand labor would be required to force the coils into the presses. The cost of such dies and the manual handling required would be prohibitive.

The object of the present invention is to provide for consolidating the end turns of high voltage coils to provide substantially void-free insulation, thereby improving the electrical and mechanical properties of the entire coil.

A further object of the invention is to provide a process for readily and conveniently consolidating the end turn insulation of a high voltage coil.

A still further object of the invention is to provide elastomeric strip members enabling the convenient and ready consolidation of the end turn insulation of a high voltage coil.

Another object of the invention is to provide a high voltage coil in which all of the insulation is consolidated into a substantially void-free structure characterized by predetermined shape and size.

Other objects of the invention will, in part, be obvious and will, in part, appear hereinafter. For a better understanding of the nature and objects of the invention, reference should be had to the following detailed description and drawing, in which:

Figure 1 is a fragmentary view in elevation, partly broken;

Fig. 2 is a cross section through a coil;

Fig. 3 is a cross section through a modification;

Fig. 4 is a plan view of a strip;

Fig. 5 is an end view of the strip of Fig. 4;

Fig. 6 is a plan view of a modified form of strip; and

Fig. 7 is a plan view of a still further modification of a strip.

In accordance with this invention, a process using certain elastomeric molding strips has been discovered whereby coil end turns of almost any shape and size may be consolidated rapidly and effectively, regardless of the variations normally occurring from coil to coil. Consolidated end turn insulation produced by the process has proven to be outstanding in electrical tests.

Referring to Fig. 1 of the drawing, there is illustrated the practice of the process as applied to a coil 10 consisting of relatively straight slot portions 12, and an end turn comprising a first bend 14, a U-shaped loop 16 and a second bend 18. The insulation 19 applied to the coil ordinarily comprises a combination of sheet or tape wrapping and a plastic binder and impregnant. The plastic binder and impregnant may be composed of a single material or a plurality of different substances. Thus, for example, the applied insulation may comprise a wrapping of one or more layers of mica tape with a specific resinous binder for the mica flakes, and after the mica tape has been wrapped on the coil, the entire coil is impregnated with a resinous varnish which is ordinarily different from the mica binder, but may be the same. Thus, in some cases the mica tape may carry an asphalt binder, and the entire coil may be impregnated with asphalt after being wrapped with the mica tape. Again the coil insulation may comprise layers of mica tape overlaid with an exterior wrapping of cotton tape, glass fiber tape or asbestos tape. In some cases, varnished cambric may be used for such overwrapping. A coil may consist of one or more separate conductors. If the coil consists of a plurality of conductors or strands, there may be individual turn or strand insulation applied to each conductor or strand before it is made into a coil. The turn insulation may comprise a coating of enamel, a layer of mica tape, a layer of glass fibers treated with enamel, or an asbestos tape wrapping or combinations thereof. In some cases the insulation on each turn is treated with a separate impregnation or dip of resin. No matter how formed and assembled, the insulation 19 comprises a sheet wrapping, and a plastic binder and impregnant. No matter how tightly wrapped the sheet wrapping exhibits air pockets, voids and the like. Furthermore, the insulation is relatively uncompacted and loose so that the coil is not very strong mechanically or is weak electrically.

In order to consolidate the coil and its applied insulation into an integral compact unit possessing sufficient mechanical strength and good electrical properties along with a suitable size and shape for best use in electrical apparatus, the slot portions 12 of the coil are placed within a suitable press or mold. As illustrated in the drawing, such mold may comprise pairs of flat bars 20, ordinarily but not necessarily of steel or other metal, with screw clamp means 22 for compressing the insulation on each side of the slot portion. In other cases, the slot portions 12 may be placed in a suitable hydraulic or mechanical press capable of compressing all of the sides of the coil.

The bends 14 and 18 of the end turn portions of the coil have disposed at the sides thereof strips 24 and 26 of an elastomer. The strips of the elastomer, as shown in section in Fig. 2 of the drawing, are as wide as the flat sides of the end turns. The strips also are rounded. The strips of elastomer are applied so as to butt against the bars 20 as an extension of the consolidated insulation in the slot portions. The end turns and the applied strips 24 and 26 are then tightly wrapped by a suitable filamentary compressing wrapping 28, such, for example, as a cotton tape, rubber tape, cord, steel wire, or other material. In applying the compressing wrapping 28, sufficient tension should be applied to compress the elastomeric strips so as to maintain a considerable pressure on the sides of the end turn portions.

As shown in Fig. 2 of the drawing, a plurality of clips 50 of bronze, steel or other flexible material may be applied to the strips 24 and 26 to retain them in place during the wrapping operation. As the wrapping progresses, the clips 50 are removed. The elastomeric strips can be easily bent to fit the flat sides of the end turns irrespective of their geometry and irregularities.

As shown in Fig. 2 of the drawing, the end turn 14 consists of a plurality of assembled conductors 40 insulated with turn insulation 42 and a wrapping of ground insulation 44 comprising sheet wrapping and a plastic binder, applied to the entire assembly. The coil presents a relatively narrow top and bottom 46, and relatively flat sides 48, much wider than the top so that the coil is a relatively thin coil. The compressing wrapping 28 compresses the elastomeric strips 24 and 26 so as to compact and flatten the insulation 44 into a compact and straight-sided layer forced against conductors 40. The elastomer strips 24 and 26 prevent bulging of the wrapped insulation 44 and thereby eliminate any voids. Since the top and bottom portions of the coil are narrow, the compressing wrapping 28 tends to keep the insulation in those portions relatively flat and compact.

While Fig. 1 shows only a part of the entire end turn 14, 16, 18 being compacted, since such portion is adjacent the slot portions, this treatment is adequate for many purposes. If desired, all of the end turns or any suitable portion thereof may be similarly treated.

The clamped and compacted coil of Figs. 1 and 2 is subjected to heat treatment to cause the applied plastic in the insulation 44 to soften so that under the influence of the pressure applied by the compressed elastomeric strips 24 and 26 it will distribute itself to fill any voids and impregnate the wrapping. If the plastic material is a heat hardening resin, heat treatment should be continued until the resin heat hardens or polymerizes to a solid state. Thereafter the coil may be cooled and the wrapping 28 and strips 24 and 26 be removed and the bars 20 unclamped. If a thermoplastic such as asphalt, cellulose acetate or ethyl cellulose or the like is employed as the plastic binder, the coil after being heated to a temperature sufficient to allow the thermoplastic to flow while confined in the manner indicated in Fig. 1, may be then cooled, and the strips 26 and 28 and the bars 20 removed therefrom. A coil with the insulation consolidated uniformly not only in the slot portions but at the end turns as well results.

The elastomeric strips 26 and 26 effectively eliminate bowing or bulging of the insulation along the flat sides of the end turns, which bulging is particularly pronounced when only the slot portions of the conductors are pressed to shape and size. For square coils or coils having a relatively wide top and bottom, as compared to the width of the sides, an additional pair of strips of elastomer may be required at the top and bottom, as illustrated in Fig. 3 of the drawing. As they are shown, the end turn 60 comprising a plurality of conductors 62, each carrying turn insulation 64 and the whole wrapped with sheet ground insulation 66 carrying a suitable plastic binder, have applied thereto the pair of strips 68 and 70 at the sides, and another pair of strips 72 and 74 at the top and bottom thereof. The strips 68, 70, 72 and 74 are made from an elastomer. A filamentary tape 76 or the like may be tightly wrapped about the four sets of strips to compress them, thereby to compact the insulation 64 and 66. The coil may be heat treated to first soften the plastic binder and then to harden it as required.

The strips of elastomer may be varied in size and shape to accommodate various end turn geometry. We have employed elastomeric strips, such as shown in Figs. 4 to 7 of the drawing, for many types of coils. As shown in Figs. 4 and 5, a straight elastomeric strip 80 has one end 82 cut off at an angle to enable its use with an end turn pitched upwardly from the slot portion, the length of the strip may be easily flexed to accommodate itself to the lateral conformation of the end turn. As shown in Fig. 5, the strip 80 has a flat side 84 for facing the side of the coil and a rounded portion 86 to be placed in contact with a confining wrapping material. The rounded portion 86 may be circular or elliptical, or only roughly rounded. We have secured good results with strips whose width is substantially the width of the coil and the cross section being semi-elliptical with the minor axis varying from ¾ inch to 1 inch for use with coils from 1 inch to 3 inches in width.

In Fig. 6, there is illustrated a second form of strip 90 which is employed with end turns pitched sharply at two points with respect to the slot portion of the coil. The strip 90 is provided with an angular face 92 to abut the slot mold. The angular portion 94 enables the strip 90 to fit the end turn conveniently without requiring excessive fitting and clipping with clips, such as 50, to retain it in place. The strip 90 is rounded in the manner indicated for the strips of Figs. 4 and 5.

For consolidating and compacting the insulation of the entire end turn, we have employed pairs of U-shaped strips 96, as shown in Fig. 7 of the drawing. The ends 98 and 100 of the strip are both cut at an angle to adapt them to the pitch of the end turn. The U-shaped strip 96 may be bent to conform to the various convolutions of the end turn.

The strips 24, 26, 80, 90, 96 may be prepared from any suitable elastomer, the selection depending upon the solvents and temperatures to which they may be exposed. We have had good success with strips made from neoprene rubber. However, strips made from natural rubber or butadiene-styrene copolymers or butadiene acrylonitrile copolymers are satisfactory. For extremely high temperature processes, strips made from silicone rubbers are excellent.

In preparing the elastomeric strips, we have found it convenient to shape an unvulcanized elastomer, which is somewhat plastic, such as unvulcanized neoprene, into long rod-like masses of a triangular, rounded or rough semi-circular cross-section of a width roughly that of the width of the coil, apply the rod-like masses upon the sides of a coil, and wrap it well with tape under suitable tension. The tape wrapping will form the unvulcanized elastomer into a partly circular or a semi-elliptical cross section having form-fitting contact with the coil. Upon heat treating the coil the elastomer will be vulcanized. When the tape wrapping is removed, the strips of vulcanized elastomer may be removed and will be found to be shaped to fit nearly perfectly other similar coils. We have successfully used this method of forming the elastomeric strips for use with similar coils which are made in large quantities.

The use of wetted cotton tape for the wrapping is helpful in some cases, since after the wet cotton tape is wrapped about the strips by hand tension, the drying of the cotton tape causes it to shrink and thus more tension is induced, and thereby compressing the elastomer strips even more.

We have found that end turn insulation consolidated as disclosed herein is markedly improved over unconsolidated insulation. Thus, in a coil insulated with mica insulation applied as disclosed in a copending application Serial No. 47,008, filed October 28, 1948, now Patent No. 2,473,805, and impregnated with the polyester resin thereof, the slot consolidated portions had a power factor of 4.8% when tested at 2 kilovolts, and the end turn corners consolidated as disclosed herein also had a power factor of 4.8% at 2 kilovolts. At 16 kilovolts, the power factor of the slot portion was 9% while the power factor of the end turn corner portion was 11.1%. The dielectric strength of the consolidated end turn portion was 67.5 kilovolts, while that of the consolidated slot portion was 69.5 kilovolts. The dielectric strength in particular indicates excellent insulation.

By the process herein, the size and shape of the end turn insulation can be controlled within narrow limits. In addition, the end turn insulation can be compacted whereby corona within the insulation is almost entirely eliminated. In addition, the electrical insulation properties, such as dielectric strength of the end turn insulation, is raised to a value substantially equal to that of the slot cell portion of the insulation.

The end turns of coils may be of a variety of shapes other than that shown in the drawing, thus many coils have very simple U-bends while others have extremely complex structures. This invention applies not only to coils having more than one slot portion but applies to coils having a single slot portion.

While coils consolidated as shown and described herein are particularly suitable for generator and motor applications, coils for electromagnetic applications generally, such as are used without iron cores, may be prepared similarly.

In some cases the entire coil may be shaped by the use of elastomeric strips on both the slot section and the end turns. Coils so prepared will be as satisfactory in dielectric properties as those in which the slot section is molded in a press. The slot sections may be sanded or milled to smoothen them, if necessary, after molding so as to fit into the slots of the magnetic cores.

It is intended that all matter contained in the above description and in the accompanying drawing shall be deemed to be illustrative and not limiting.

We claim as our invention:

1. In the process of consolidating and sizing a high voltage, flat-sided coil having a relatively straight slot portion and an end turn to both of which is applied insulation comprising sheet wrapping and a plastic binder and impregnant, the steps comprising placing the slot portion in a confining mold for compacting the sheet wrapping and plastic to provide a slot portion of predetermined size and shape, placing pairs of rounded elastomeric strips along the flat sides of the end turns, the strips being substantially as wide as the flat portions, the strips abutting the ends of the mold and extending for a substantial distance therefrom, pressing the elastomeric strips against the flat sides to compact the end turn sheet wrapping and plastic, heating the coil while so confined and pressed to cause the applied plastic to soften and distribute itself in the sheet wrapping and to eliminate voids, the mold and elastomeric strips compressing the sheet wrapping to size and shape, hardening the applied plastic to retain the sheet wrapping in compacted and pressed form, thereafter removing the coil from the mold and removing the elastomeric strips.

2. In the process of consolidating and sizing a high voltage, flat-sided coil having a relatively straight slot portion and an end turn to both of which is applied insulation comprising sheet wrapping and a plastic binder and impregnant, the steps comprising placing the slot portion in a confining mold for compacting the sheet wrapping and plastic to provide a slot portion of predetermined size and shape, placing pairs of rounded elastomeric strips along the flat sides of the end turns, the strips being substantially as wide as the flat portions, the strips abutting the ends of the mold and extending for a substantial distance therefrom tightly wrapping filamentary material about the elastomeric strips and end turns to compress the elastomeric strips against the flat sides to compact the end turn sheet wrapping and plastic, heating the coil while so confined and pressed to cause the applied plastic to soften and distribute itself in the sheet wrapping and to eliminate voids, the mold and elastomeric strips compressing the sheet wrapping to size and shape, hardening the applied plastic to retain the sheet wrapping in compacted and pressed form, thereafter removing the coil from the mold and removing the elastomeric strips.

3. In the process of consolidating and sizing a high voltage, flat-sided coil having a relatively straight slot portion and a looped end turn to both of which is applied sheet wrapping insulation and a plastic binder and impregnant, the steps comprising placing the slot portion in a confining mold for compacting the sheet wrapping and plastic to provide a slot portion of predetermined size and shape, placing pairs of rounded U-shaped elastomeric strips along the flat sides of the end turns, the strips abutting the ends of the mold and extending over the entire loop of the end turn, pressing the elastomeric strips against the flat sides to compact the end turn sheet wrapping and plastic, heating the coil while so confined and pressed to cause the applied plastic to soften and distribute itself in the sheet wrapping and to eliminate voids, the mold and elastomeric strips compressing the sheet wrapping to size and shape, hardening the applied plastic to retain the sheet wrapping in compacted and pressed form, thereafter removing the coil from the mold and removing the elastomeric strips.

4. In the process of consolidating and sizing a high voltage, flat-sided coil having a relatively straight solt portion and an end turn to both of which is applied sheet wrapping insulation and a heat hardening resin binder and impregnant, the steps comprising placing the slot portion in a confining mold for compacting the sheet wrapping and resin to provide a slot portion of predetermined size and shape, placing pairs of rounded elastomeric strips along the flat sides of the end turns, the strips being substantially as wide as the flat portions, the strips abutting the ends of the mold and extending for a substantial distance therefrom, pressing the elastomeric strips against the flat sides to compact the end turn sheet wrapping and resin, heating the coil while so confined and pressed to cause initially the applied resin to soften and distribute itself in the sheet wrapping and to eliminate voids, the mold and elastomeric strips compressing the sheet wrapping to size and shape, continued application of heating causing heat hardening the applied resin to retain the sheet wrapping in compacted and pressed form, thereafter removing the coil from the mold and removing the elastomeric strips.

5. In the process of preparing a coil having end turns with flat sides consolidated to desired size, the end turns carrying insulation comprising tape wrapping and a plastic applied thereto, the steps comprising applying a pair of rounded strips of elastomer of a width substantially the width of the flat coil sides to the flat sides of the end turns, pressing the applied strips of elastomer tightly against two flat sides so that the end turn insulation is compacted and the elastomer is compressed, heating the compressed assembly to a temperature to cause the plastic to soften and distribute itself and fill any voids in the tape wrapping under the action of the compressed strips of elastomer, hardening the applied plastic while so confined, terminating, applying pressing, and removing the strips from the end turns when the plastic is sufficiently hardened.

6. In the process of preparing a coil with consolidated flat-sided end turns of predetermined size and shape, the end turn insulation comprising a tape wrapping and a heat hardening resinous binder applied thereto, the resinous binder first softening and then polymerizing to a solid upon heat treatment, the steps comprising applying a pair of rounded strips of elastomer to the flat sides of the end turns, the strips being substantially as wide as the flat sides, applying a tight wrapping about the strips of elastomer to compress them against the coil sides, heating the assembly first to cause the resinous binder to soften it whereby the compressed elastomer strips compact the tape wrapping and distribute the binder therein to fill any voids and consolidate the insulation, continuing the heating to polymerize the resinous binder to a solid state so that the insulation will retain its shape on removal of the strips, and thereafter unwrapping the strips and removing them.

7. In the process of preparing a coil with consolidated flat-sided end turns of predetermined size and shape, the end turn insulation comprising a tape wrapping and a heat hardening resinous binder applied thereto, the resinous binder first softening and then polymerizing to a solid upon heat treatment, the steps comprising applying a pair of U-shaped rounded strips of elastomer to the flat sides of the end turns, the strips being substantially as wide as the flat sides and coextensive with the end turn, applying a tight wrapping about the strips of elastomer to compress them against the coil sides, heating the assembly first to cause the resinous binder to soften it whereby the compressed elastomer strips compact the tape wrapping and distribute the binder therein to fill any voids and consolidate the insulation, continuing the heating to polymerize the resinous binder to a solid state so that the insulation will retain its shape on removal of the strips, and thereafter unwrapping the strips and removing them.

8. In the process of preparing a coil with consolidated flat-sided end turns and slot portions of predetermined size and shape, the coil insulation comprising a tape wrapping and a heat hardening resinous binder applied thereto, the resinous binder first softening and then polymerizing to a solid upon heat treatment, the steps comprising applying a pair of rounded strips of elastomer to the flat sides of the end turns and slot portions, the strips being substantially as wide as the flat sides, applying a tight wrapping about the strips of elastomer to compress them against the coil sides, heating the assembly first to cause the resinous binder to soften it whereby the compressed elastomer strips compact the tape wrapping and distribute the binder therein to fill any voids and consolidate the insulation, continuing the heating to polymerize the resinous binder to a solid state so that the insulation will retain its shape on removal of the strips, and thereafter unwrapping the strips and removing them.

9. In the process of consolidating and compacting the applied insulation on a coil having flat sides, the insulation comprising a sheet wrapping and a plastic binder softening when heated, the steps comprising applying to a flat side a strip of plastic unvulcanized elastomer that can be vulcanized by heat treatment, wrapping the strip with a tape under sufficient tension to form the plastic strips into a shape with a cross section having a flat side against the coil, the flat side being as wide as the side of the coil, and a rounded side in contact with the tape, heat-treating the coil and wrapped elastomer to vulcanize the elastomer and to consolidate the coil insulation as a result of the softening of the plastic binder during the heat treatment.

JOHN C. BOTTS.
HAROLD M. PHILOFSKY.

REFERENCES CITED

The following references are of record in the file of this patent:

UNITED STATES PATENTS

| Number | Name | Date |
|---|---|---|
| 2,269,185 | Dawson | Jan. 6, 1942 |